United States Patent
Wang et al.

(10) Patent No.: US 8,162,224 B2
(45) Date of Patent: Apr. 24, 2012

(54) METHOD OF SETTING AMOUNT OF EXPOSURE FOR PHOTODETECTOR ARRAY IN BARCODE SCANNER

(75) Inventors: Dayou Wang, Port Jefferson Station, NY (US); Joseph Cai, Rocky Point, NY (US); Michelle Wang, Port Jefferson Station, NY (US)

(73) Assignee: Symbol Technologies, Inc., Holtsville, NY (US)

(*) Notice: Subject to any disclaimer, the term of this patent is extended or adjusted under 35 U.S.C. 154(b) by 411 days.

(21) Appl. No.: 12/511,485

(22) Filed: Jul. 29, 2009

(65) Prior Publication Data
US 2011/0024505 A1    Feb. 3, 2011

(51) Int. Cl.
*G06K 7/10* (2006.01)
(52) U.S. Cl. .................................. 235/462.41
(58) Field of Classification Search .............. 235/454, 235/462.01, 462.41
See application file for complete search history.

(56) References Cited

U.S. PATENT DOCUMENTS

| | | | |
|---|---|---|---|
| 5,784,102 A | 7/1998 | Hussey et al. | |
| 6,722,567 B2* | 4/2004 | Shaked et al. | 235/462.01 |
| 7,337,970 B2* | 3/2008 | Joseph et al. | 235/462.1 |
| 7,533,815 B2* | 5/2009 | Brock et al. | 235/454 |

FOREIGN PATENT DOCUMENTS

| | | |
|---|---|---|
| EP | 1133168 A2 | 9/2001 |
| WO | 9603708 A1 | 8/1996 |

OTHER PUBLICATIONS

International Search Report and Written Opinion mailed on Nov. 7, 2011 for International Application No. PCT/US2010/040134.

* cited by examiner

*Primary Examiner* — Seung Lee
(74) *Attorney, Agent, or Firm* — Nong-Qiang Fan

(57) ABSTRACT

A method and apparatus for setting the amount of exposure for the photodetector array in a barcode scanner. An image is captured with the photodetector array. The type for each sub-region in the multiple sub-regions in the image captured is determined. Each sub-region in the multiple sub-regions is assigned a weight based on the type of the sub-region. The amount of exposure for the photodetector array in the barcode scanner is set automatically based on the weight for each sub-region in the multiple sub-regions. In some embodiments, the predetermined image area are repartitioned into new multiple sub-regions based on the image captured, and the amount of exposure for the photodetector array in the barcode scanner is set automatically based on the weight for each sub-region in the new multiple sub-regions.

19 Claims, 9 Drawing Sheets

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

*FIG. 3A*

| 0.5 | 0.5 | 0.5 | 0.5 | 0.5 |
|---|---|---|---|---|
| 0.5 | 0.8 | 0.8 | 0.8 | 0.5 |
| 0.5 | 0.8 | 1 | 0.8 | 0.5 |
| 0.5 | 0.8 | 0.8 | 0.8 | 0.5 |
| 0.5 | 0.5 | 0.5 | 0.5 | 0.5 |

*FIG. 3B*

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

*FIG. 3C*

| 1 | 1 | 0.2 | 0.2 | 1 |
|---|---|---|---|---|
| 1 | 1 | 0.2 | 0.2 | 1 |
| 1 | 1 | 1 | 1 | 1 |
| 1 | 1 | 1 | 1 | 1 |
| 1 | 1 | 1 | 1 | 1 |

*FIG. 4B*

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

*FIG. 4C*

METHOD OF SETTING AMOUNT OF EXPOSURE FOR PHOTODETECTOR ARRAY IN BARCODE SCANNER

FIELD OF THE DISCLOSURE

The present disclosure relates generally to barcode scanners.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Systems that read and decode bar codes employing charged coupled device (CCD) or complementary metal oxide semiconductor (CMOS) based imaging systems are typically referred to hereinafter as imaging systems, imaging-based bar code readers, or imaging scanners.

Imaging systems electro-optically transform the graphic indicia into electrical signals, which are decoded into alpha-numerical characters that are intended to be descriptive of the article or some characteristic thereof. The characters are then typically represented in digital form and utilized as an input to a data processing system for various end-user applications such as point-of-sale processing, inventory control and the like.

Imaging systems that include CCD, CMOS, or other imaging configurations comprise a plurality of photosensitive elements (photosensors) or pixels typically aligned in an array pattern that could include a number of arrays. The imaging-based bar code reader systems employ light emitting diodes (LEDs) or other light sources for illuminating a target object, e.g., a target bar code. Light reflected from the target bar code is focused through a lens of the imaging system onto the pixel array. As a result, the focusing lens generates an image from its field of view (FOV) that is projected onto the pixel array. Periodically, the pixels of the array are sequentially read out creating an analog signal representative of a captured image frame. The analog signal is amplified by a gain factor, by for example, an operational amplifier. The amplified analog signal is digitized by an analog-to-digital converter. Decoding circuitry of the imaging system processes the digitized signals representative of the captured image frame and attempts to decode the imaged bar code.

Many imagers utilize camera chips that have the capability to do hardware-based auto-exposure. The exposure is determined based on the evaluation of brightness of the scene in the field of view. Sometimes a barcode is positioned in front of a very strong backlight, such as a light. The goal of auto exposure is to make the overall image grey (neither too bright nor too dark). Due to the contribution of brightness of these very bright light souses, the auto exposure makes most part of the image very dark to maintain a desired average brightness. In this case, the barcode may become too dark to be decoded. Accordingly, there is a need for an improved method of setting the amount of exposure for the photodetector array in a barcode scanner when a very strong backlight is in the field of view.

SUMMARY

In one aspect, the invention is directed to a method of setting the amount of exposure for the photodetector array in a barcode scanner. The method includes the following: (1) selecting a predetermined image area for a photodetector array in a barcode scanner; (2) partitioning the predetermined image area into multiple sub-regions; (3) capturing an image with the photodetector array; (4) determining a type for each sub-region in the multiple sub-regions in the image captured; (5) assigning a weight to each sub-region in the multiple sub-regions based on the type of each sub-region in the multiple sub-regions; and (6) setting an amount of exposure for the photodetector array in the barcode scanner based on the weight for each sub-region in the multiple sub-regions.

In another aspect, the invention is directed to a method of setting the amount of exposure for the photodetector array in a barcode scanner. The method includes the following: (1) selecting a predetermined image area for a photodetector array in a barcode scanner; (2) partitioning the predetermined image area into multiple sub-regions; (3) capturing an image with the photodetector array; (4) repartitioning the predetermined image area into new multiple sub-regions based on the image captured; and (5) setting an amount of exposure for the photodetector array in the barcode scanner based on a weight for each sub-region in the new multiple sub-regions.

In one implementation, the step of repartitioning the predetermined image area can include the following: (1) dividing the predetermined image area into multiple statistic-blocks; (2) classifying each statistic-block in the multiple statistic-blocks in the image captured either as a first type or a second type; (3) determining a type distribution of the multiple statistic-blocks; and (4) repartitioning the predetermined image area into multiple new sub-regions based on the type distribution of the multiple statistic-blocks and assigning a weight to each new sub-region.

Implementations of the invention can include one or more of the following advantages. The amount of exposure for the photodetector array in a barcode scanner can be automatically set to enable an image of a barcode be captured with sufficient grey levels to improve the chance of successful decoding, even in the situation where such barcode is positioned in front of a very strong backlight. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 3A-3C depict some exemplary implementations in which a predetermined image area is divided into multiple sub-regions.

FIG. 4B shows an exemplary weight assignment for the captured image in FIG. 4A.

FIG. 4C shows an exemplary repartition of the image area corresponding to the captured image in FIG. 4A.

Figure 1:
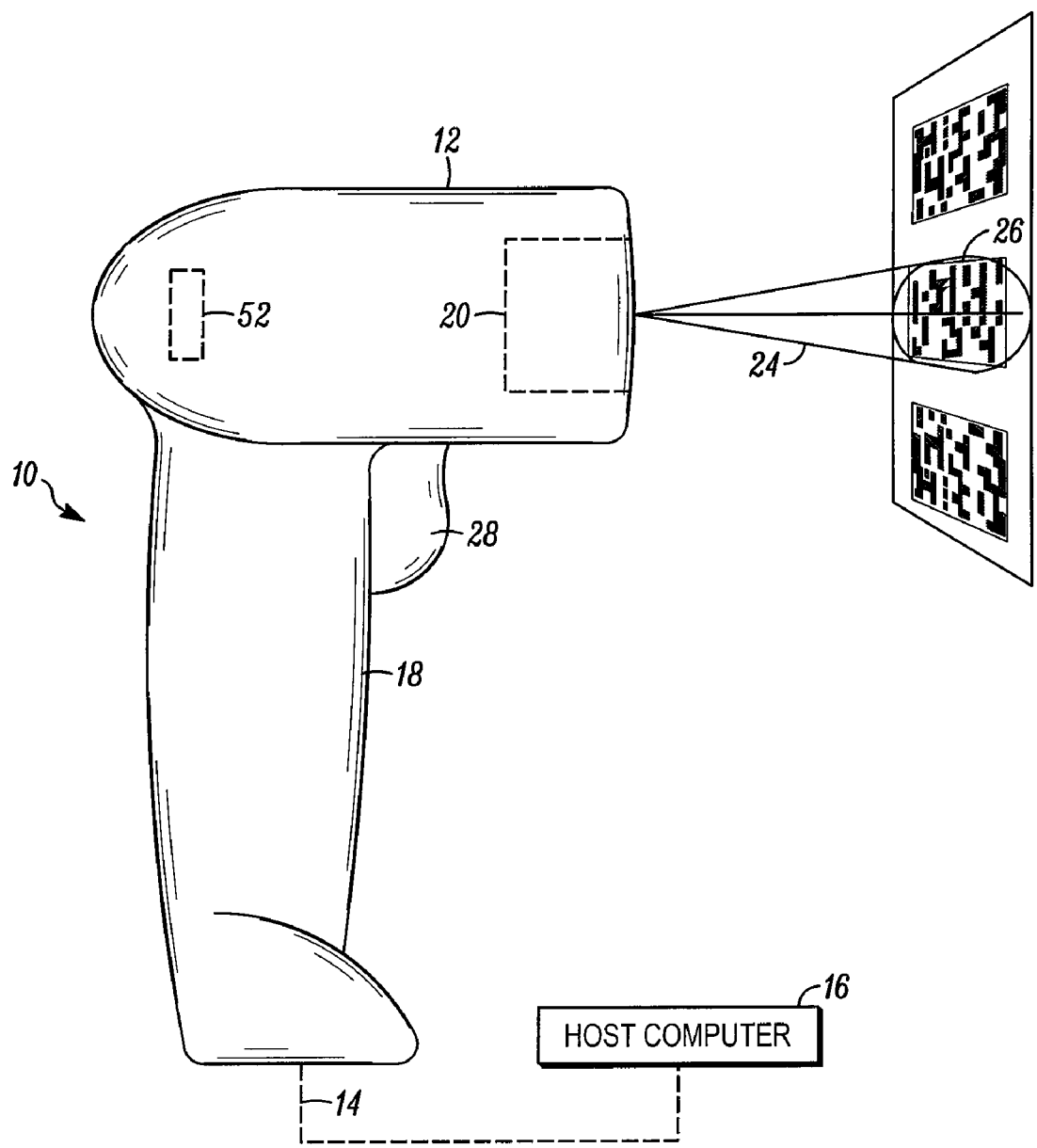
FIG. 1 is a side elevation view of an imaging scanner constructed in accordance with one example embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An imaging system 10 includes an imaging scanner 12 in communication 14 either through hard-wire or over-the-air (remote communication) to a host computer 16 as shown schematically in FIG. 1. The imaging scanner 12, in addition to imaging both 1D and 2D bar codes and postal codes, is also capable of capturing images and signatures. In one exemplary embodiment of the present invention, the imaging scanner 12 is a hand held portable imager supported in a housing 18 that can be carried and used by a user walking or riding through a store, warehouse, or plant for imaging bar codes for stocking and inventory control purposes.

However, it should be recognized that the imaging system 10 of the present invention, to be explained below, may be advantageously used in connection with any type of scanner or imaging device, be it portable or stationary. It is the intent of the present invention to encompass all such scanners and imagers.

Internal to the imaging scanner 12 is a scan engine 20. The scan engine 20 includes an illumination source 22 such as a light emitting diode (LED) or bank of LEDs for projecting light 24 at a target object 26 such as a bar code. The imaging scanner 12 can be automatically enabled, continuously enabled, or enabled by engaging a trigger 28, which initiates the projection of the light 24 in the hand-held system 10 as it is directed by a user toward the target object 26.

Figure 2:
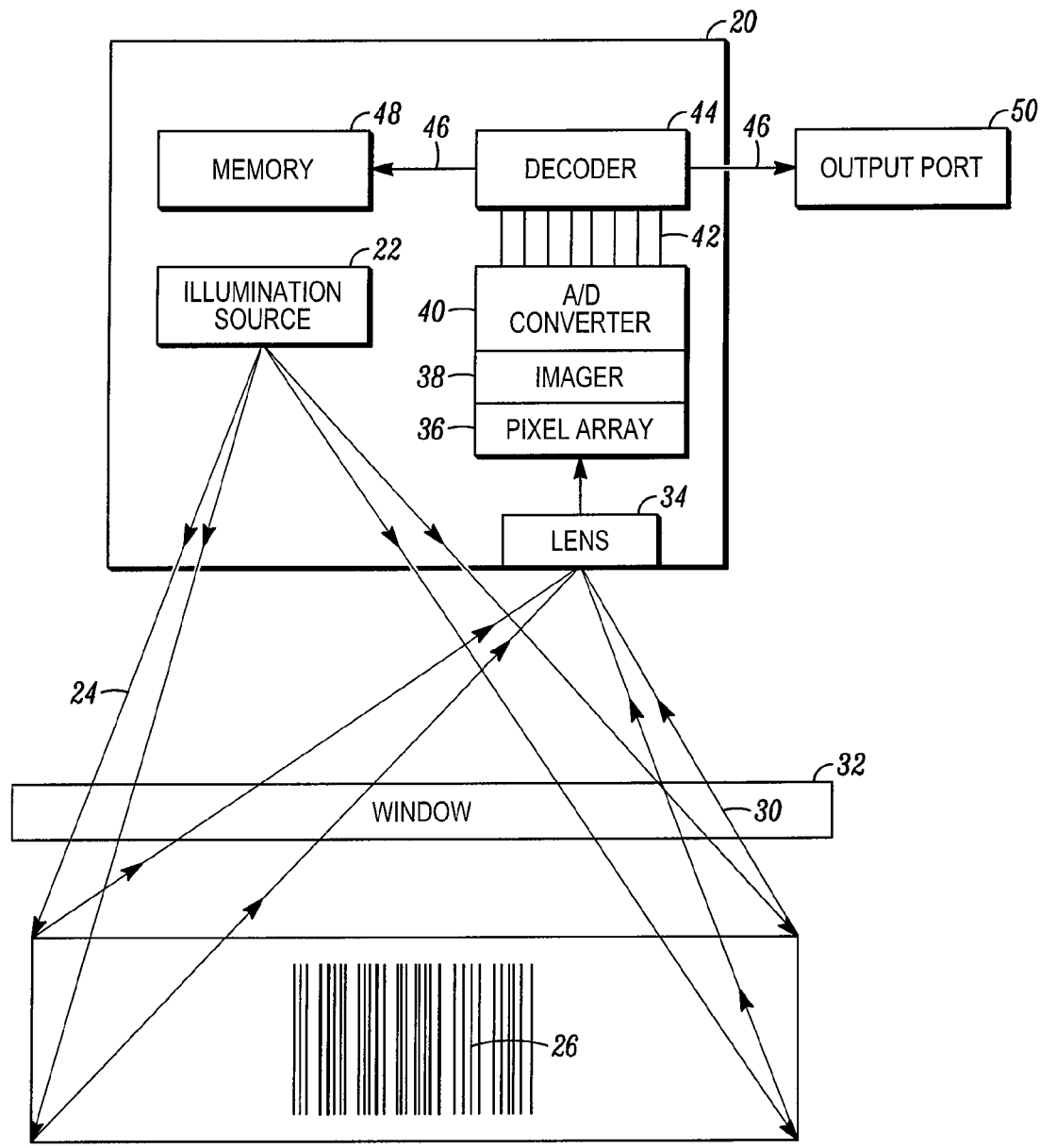
FIG. 2 is a schematic diagram illustrating a scan engine located within the imaging scanner of FIG. 1.

FIG. 2 is a schematic illustration of the scan engine 20 associated with the imaging scanner 12. Reflected light 30 from the target object 26 passes through a window 32 located in the housing 18 of the imaging scanner 12 onto a focusing lens 34 internal to the scan engine 20. The lens 34 focuses the reflected light onto a pixel array 36 of an imager element 38. The imager element 38 includes photosensitive elements such as the imaging pixel array 36 that could be for example, a charged coupled device (CCD) array or complementary metal oxide semiconductor (CMOS) array. The imager element 38 also includes an analog-to-digital (A/D) converter 40 for converting an analog signal produced by the imager element 38 over to the digital domain.

A bus connection 42 provides a communication link between the imager element 38 and a decoder 44. The bus connection 42 is a high-speed (8) bit parallel interface for providing a digital signal to the decoder 44 representative of the captured image frame. The decoder 44 processes the digitized signals and attempts to decode the target object 26 into decoded information 46. The decoded information 46 can be stored locally by the scan engine 20 in memory 48 and/or communicated to a peripheral device (not shown) such as a monitor or remote computer through an output port 50.

Imager scanners decode barcodes from 2D images captured with the imaging pixel array 36. In order to get useable barcode image, appropriate exposure is needed. Usually, the exposure includes two adjustable factors: exposure time and amplifier gain. The combination determines how much light the imaging pixel array 36 will get. The calculation of these variables can be either software-based or hardware-based.

Many imagers utilize camera chips that have the capability to do hardware-based auto-exposure. The exposure is determined based on the evaluation of brightness of a predetermined image area. To do so, the predetermined image area is divided into several sub-regions. The brightness of the whole predetermined image area is a combination of brightness of each sub-region. Different ways of dividing the predetermined image area and different schemes of combining the brightness of these sub-regions results in various kinds of auto-exposure modes, such as the average exposure mode, the center-weighted exposure mode, and the spot exposure mode.

FIGS. 3A-3C depict some exemplary implementations in which a predetermined image area is divided into 25 even-sized sub-regions of 5 rows and 5 columns. FIG. 3A shows an exemplary implementation of the average exposure mode. With the average exposure mode, the brightness of each sub-region is given equal weight, when the brightness of all sub-regions are combined to get the overall brightness of the predetermined image area. FIG. 3B shows an exemplary implementation of the center-weighted mode. With the center-weighted mode, the brightness of the sub-regions closer to the center is given more weight than the brightness of those sub-regions that are not close to the center, when the brightness of all sub-regions are combined to get the overall brightness of the predetermined image area. FIG. 3C shows an exemplary implementation of the spot exposure mode. With the spot exposure mode, only the brightness of one sub-region at a particular spot is given weight and the contribution of all other sub-regions are disregard, when the brightness of all sub-regions are combined to get the overall brightness of the predetermined image area.

Figure 4A:
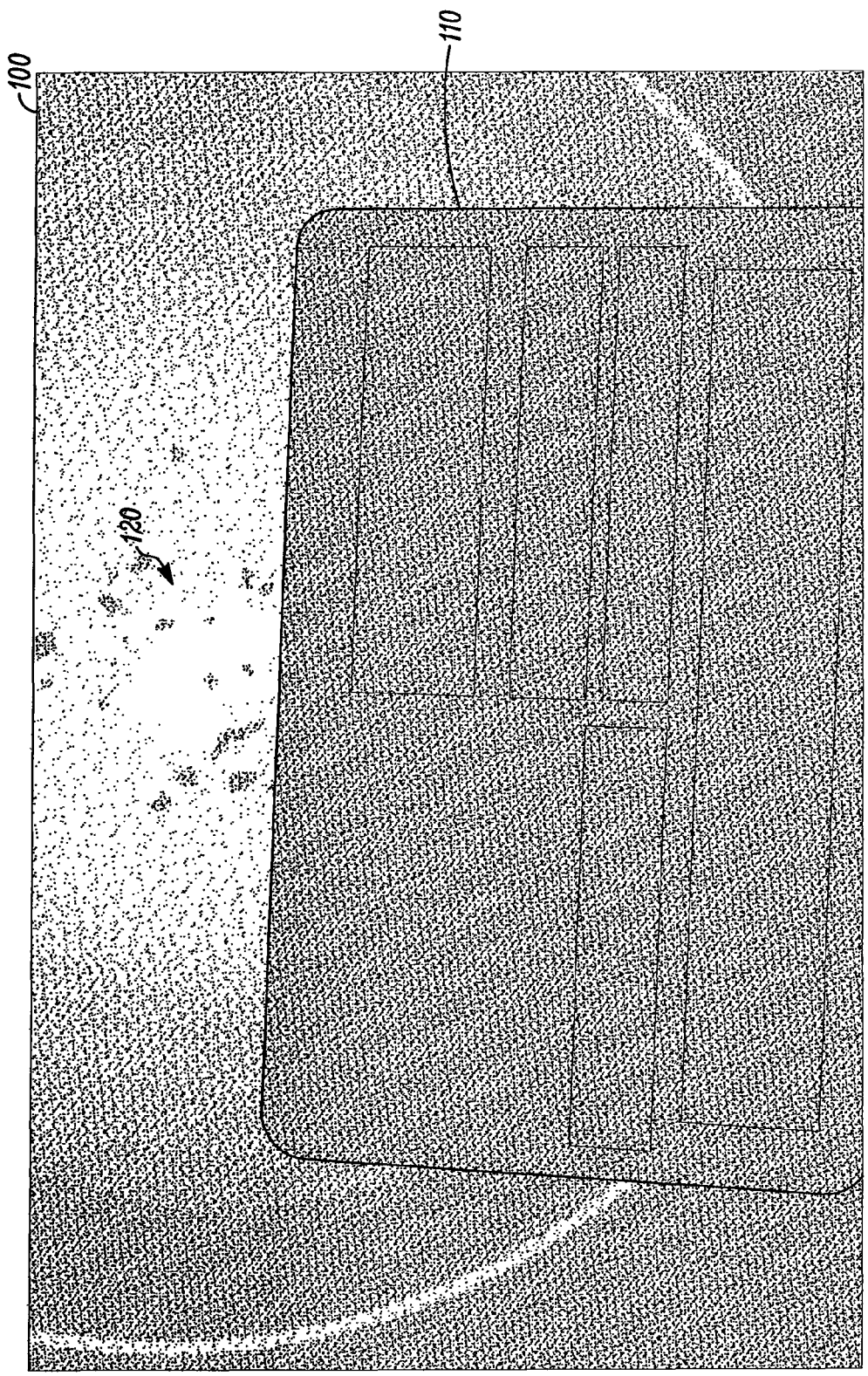
FIG. 4A shows a contour drawing of a captured image in which a barcode is positioned in front of a high intensity spot light.

In the application of scanning barcode, since the barcodes can be in any part of the field of view, the average exposure mode can be more suitable than the other two modes, especially the spot exposure mode. Sometimes a barcode is placed in front of a very strong backlight, such as a light. The goal of auto exposure is to make the overall image grey (neither too bright nor too dark). Due to the contribution of the brightness of these very bright light souses, the auto exposure makes most part of the image very dark to maintain a desired average brightness. In this case, the barcode may become too dark to be decoded. FIG. 4A shows a contour drawing of a captured image 100 in which a barcode 110 is positioned in front of a high intensity spot light 120. Because of the high intensity spot light 120, the barcode 110 in the captured image 100 is too dark to be decoded.

When a captured image has very bright and very dark sub-regions, the dark sub-regions have little contrast. In order to show details in the dark sub-regions so the barcode can be decoded, more exposure is needed. In one implementation, the weight of the sub-regions corresponding to the bright region is adaptively reassigned so the contributions of these bright sub-regions are reduced. FIG. 4B shows an exemplary weight assignment for the captured image 100 in FIG. 4A. In FIG. 4B, the weight of the sub-regions that are close to the high intensity spot light 120 is reduced to 0.2. Alternatively, the weight of these sub-regions can be set to be much smaller than 0.2. Generally, the weight of these sub-regions can be set to be less than 0.5.

In another implementation, a predetermined image area in the captured image 100 is repartitioned so that the sub-regions in the very bright area are less dense than that in the dark areas (the area of interest). This essentially reduces the contribution from the less interested area (very bright area) to the calculation of the exposure. FIG. 4C shows an exemplary repartition of the image area corresponding to the captured image 100 in FIG. 4A. In FIG. 4C, the sub-regions in the very bright area that are close to the high intensity spot light 120 are less dense than that of the sub-regions in the dark areas (the area of interest). In FIG. 4C, the weight of all sub-regions that are assigned with an equal weight 1.0. Alternatively, the weight of different sub-region can be assigned to different weight. The weight of each new sub-region can also be reassigned adaptively.

Figure 5:
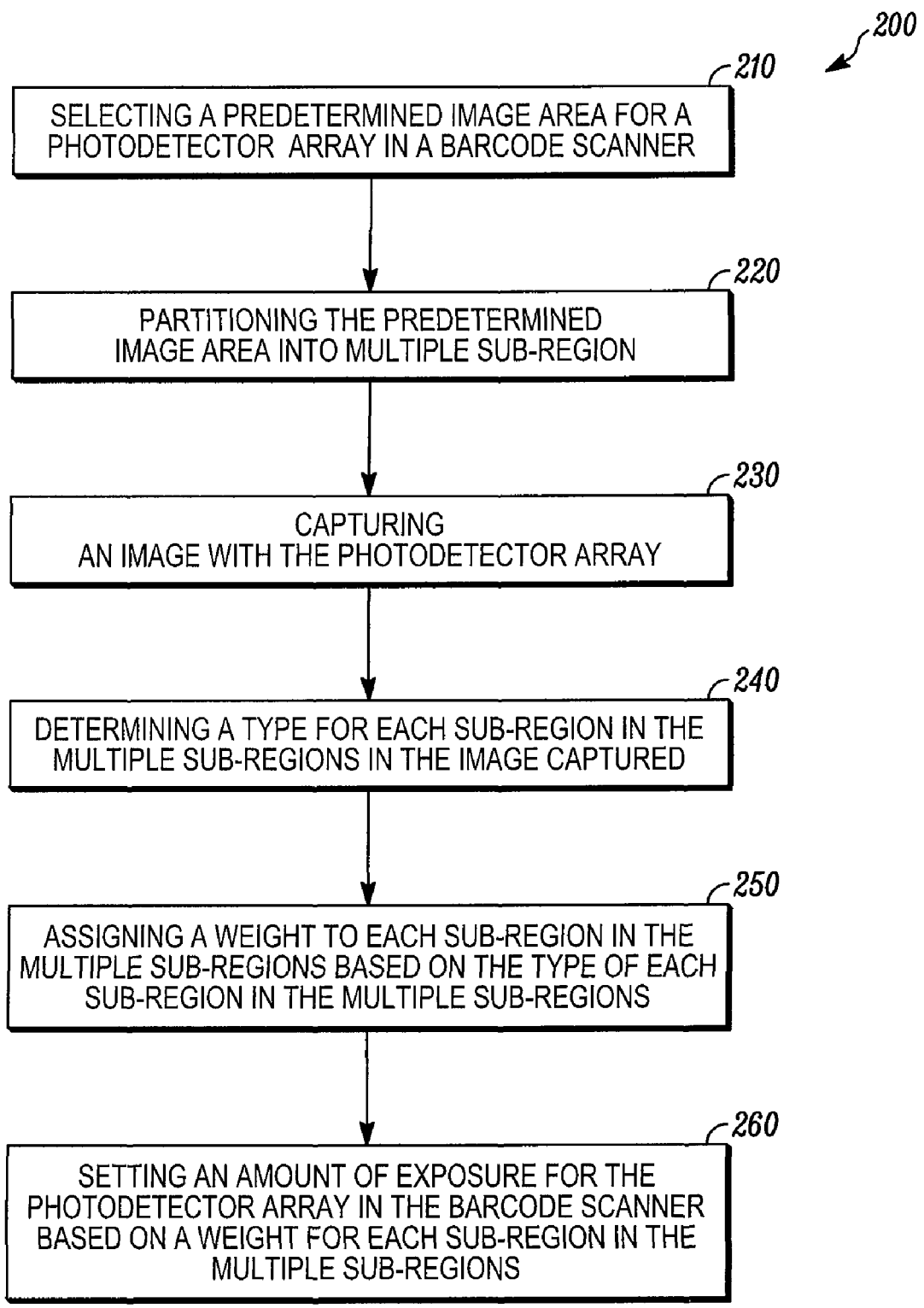
FIG. 5 shows a method for setting an amount of exposure by adaptively assigning the weight of the sub-regions in a captured image in accordance with some embodiments.

FIG. 5 shows a method 200 for setting an amount of exposure by adaptively assigning the weight of the sub-regions in a captured image in accordance with some embodiments. The method 200 includes blocks 210, 220, 230, 240, 250, and 260. At block 210, a predetermined image area is selected for a photodetector array in a barcode scanner.

At block 220, the predetermined image area is partitioned into multiple sub-regions. In one example, as shown in FIG. 4B, the predetermined image area can be partitioned into 25 sub-regions based on a 5 by 5 matrix. At block 230, an image is captured with the photodetector array.

At block 240, the type for each sub-region in the multiple sub-regions in the image captured is determined. In one implementation, each sub-region can be classified either as a first type or a second type. In some implementations, the type for each sub-region can be determined based on a histogram of pixel values. At block 250, the weight for each sub-region can be assigned based on the type of each sub-region. In one example, as shown in FIG. 4B, the weight for a sub-region is assigned a value of 0.2 if the sub-region is classified as a white type, and the weight for a sub-region is assigned a value of 1.0 if the sub-region is not classified as a white type.

At block 260, an amount of exposure for the photodetector array in the barcode scanner is set based on the weight for each sub-region. In one example, assume that the microchip device has an auto exposure function that can determine the amount of exposure based on the weight for each sub-region. If the auto exposure function is enabled, when the weight for each sub-region is set into the microchip device by writing certain bit patterns into some control registers in the microchip device, the amount of exposure for the photodetector array in the microchip device can be automatically determined.

Figure 6A:
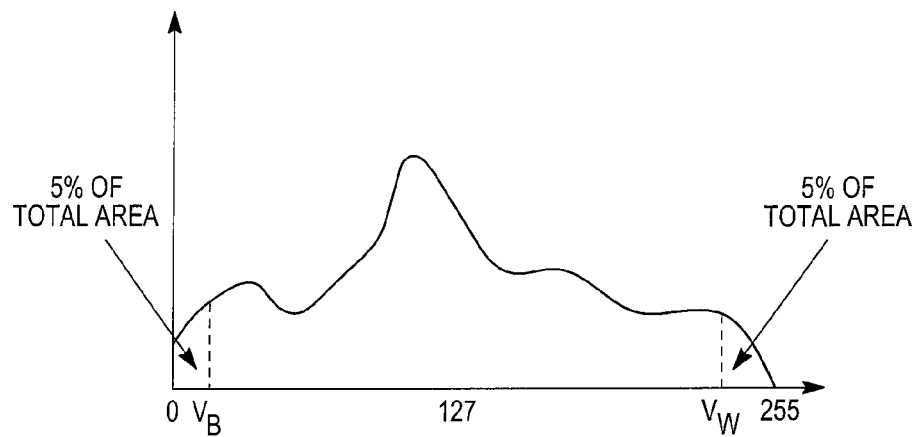
FIGS. 6A-6C depict a method of determining the type for a sub-region based on a histogram of pixel values in accordance with some embodiments.
Figure 6B:
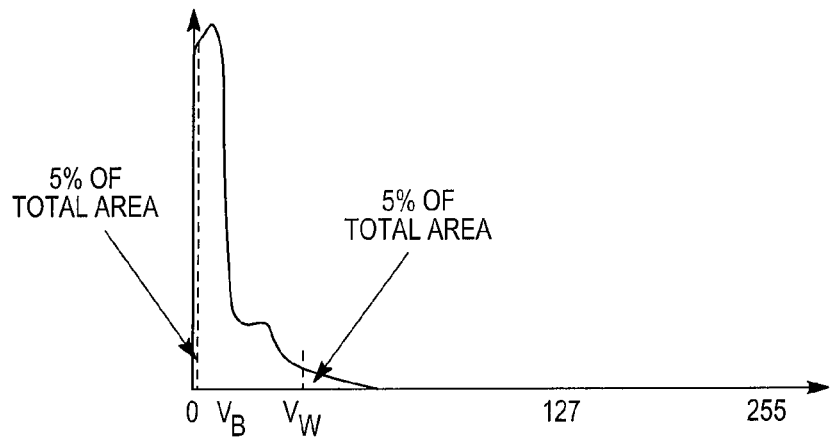
Figure 6C:
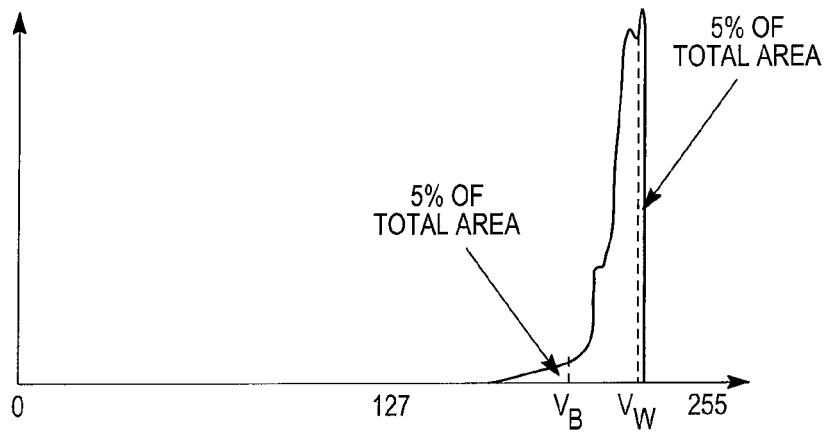

FIGS. 6A-6C depict a method of determining the type for a sub-region based on a histogram of pixel values in accordance with some embodiments. FIG. 6A shows a sample histogram that represents number of occurrence of each pixel value in a sub-region. In the case of 8-bit grey-scale image, the value in x-coordinate is all the possible pixel values, from 0 to 255. The value in y-coordinate represents number of occurrence (in the range of 0 to total number of pixels on the image) of each possible grey-scale value. The total area of the histogram curve is the total number of pixels.

In one implementation, the type for each sub-region can be determined from the Black, White and Contrast values of the histogram of the sub-region. The Black value $V_B$ is defined as the pixel value in x-coordinate at 5 percentile (5% of pixels has value that are no more than $V_B$). The White value $V_W$ is defined as the pixel value in x-coordinate at 95 percentile (5% of pixels has value that are more than $V_W$). Contrast C is defined as the difference of White and Black values: $C=V_W-V_B$. In one example, as shown in FIG. 6B, a sub-region can be classified as a black type if the white value $V_W$ is low (e.g., $V_W<50$) and the Contrast value C is small (e.g., $V_B<30$). In one example, as shown in FIG. 6C, a sub-region can be classified as a white type if the Black value $V_B$ is high (e.g., $V_B>200$) and the Contrast value C is small (e.g., $V_B<30$).

Figure 7A:
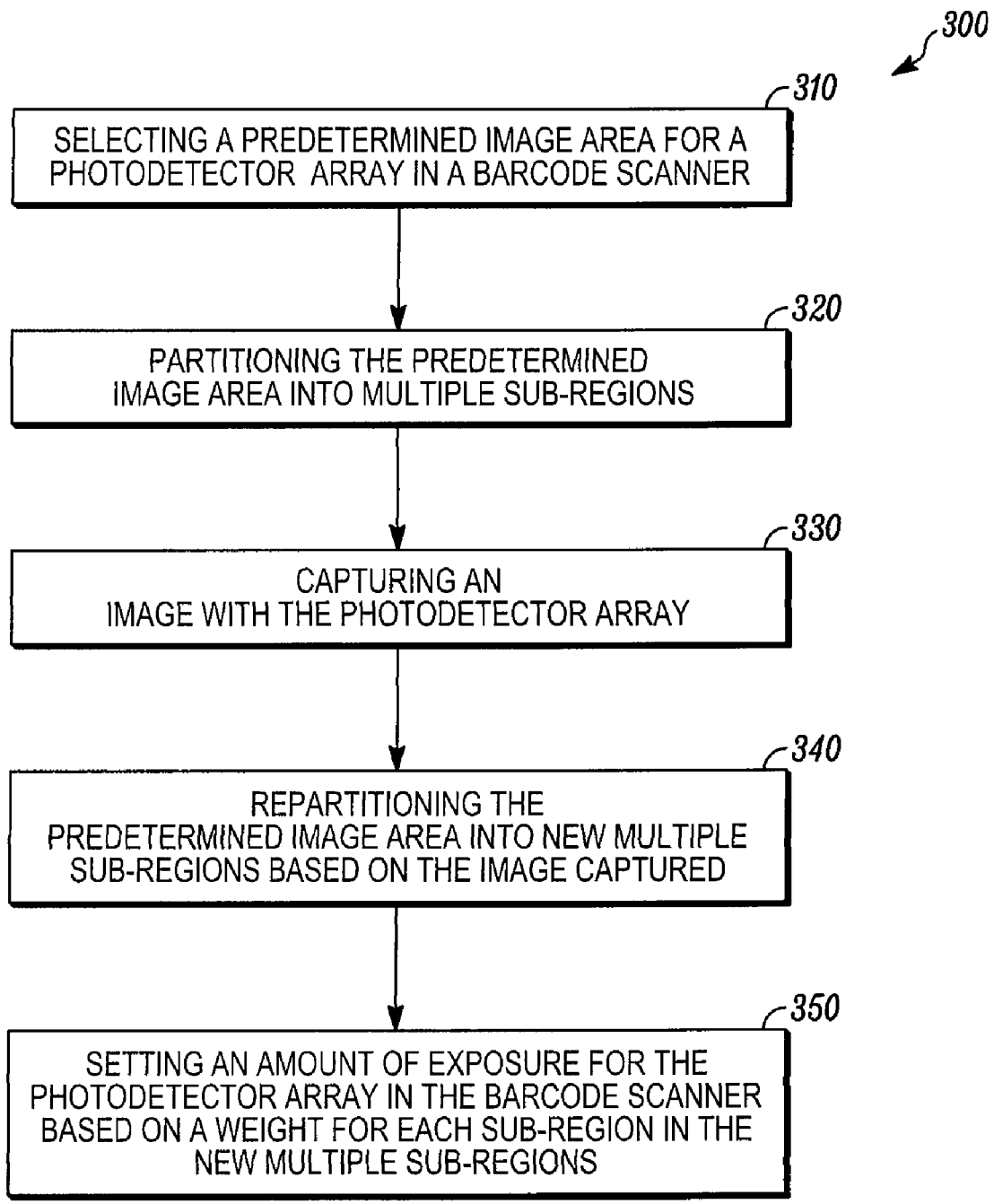
FIG. 7A shows a method for setting an amount of exposure by adaptively repartitioning a captured image in accordance with some embodiments.

FIG. 7A shows a method 300 for setting an amount of exposure by adaptively repartitioning a captured image in accordance with some embodiments. The method 300 includes blocks 310, 320, 330, 340, and 350. At block 310, a predetermined image area is selected for a photodetector array in a barcode scanner. At block 320, the predetermined image area is partitioned into multiple sub-regions. At block 330, an image is captured with the photodetector array. At block 340, the predetermined image area is repartitioned based on the image captured into new multiple sub-regions. At block 350, an amount of exposure for the photodetector array in the barcode scanner is set based on the weight for each sub-region in the new multiple sub-regions.

Figure 7B:
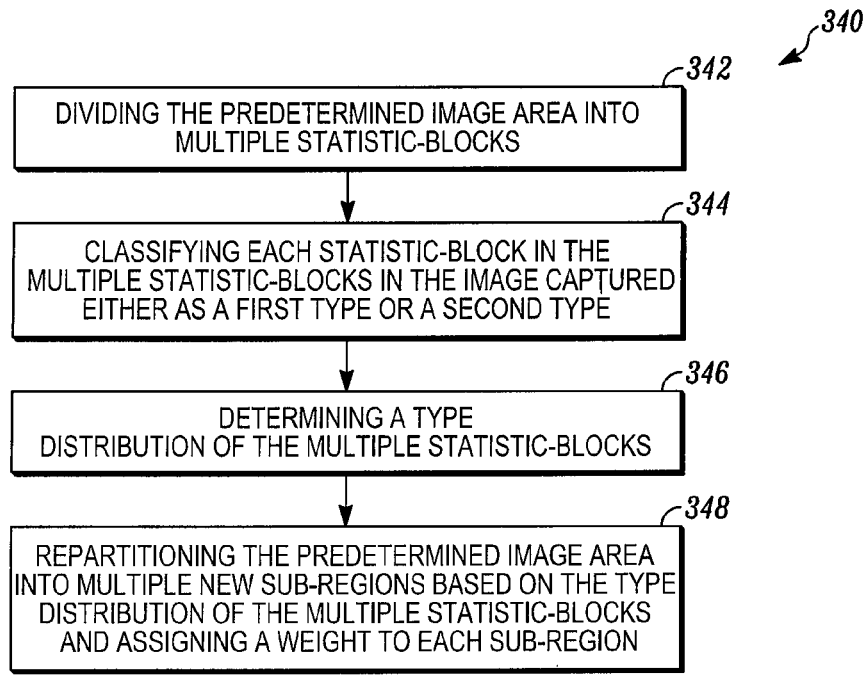
FIG. 7B shows one implementation of the block 340 in FIG. 7A.

FIG. 7B shows one implementation of the block 340 in which the predetermined image area is partitioned based on the type distribution of multiple statistic-blocks. In FIG. 7B, the block 340 includes blocks 342, 344, 346, and 348. At block 342, the predetermined image area is divided into multiple statistic-blocks. At block 344, each statistic-block in the multiple statistic-blocks in the image captured is classified either as a first type or a second type. At block 346, a type distribution of the multiple statistic-blocks is determined. At block 348, the predetermined image area is repartitioned into multiple new sub-regions based on the type distribution of the multiple statistic-blocks. In addition, a weight can be assigned to each sub-region.

Figures 8A, 8B:
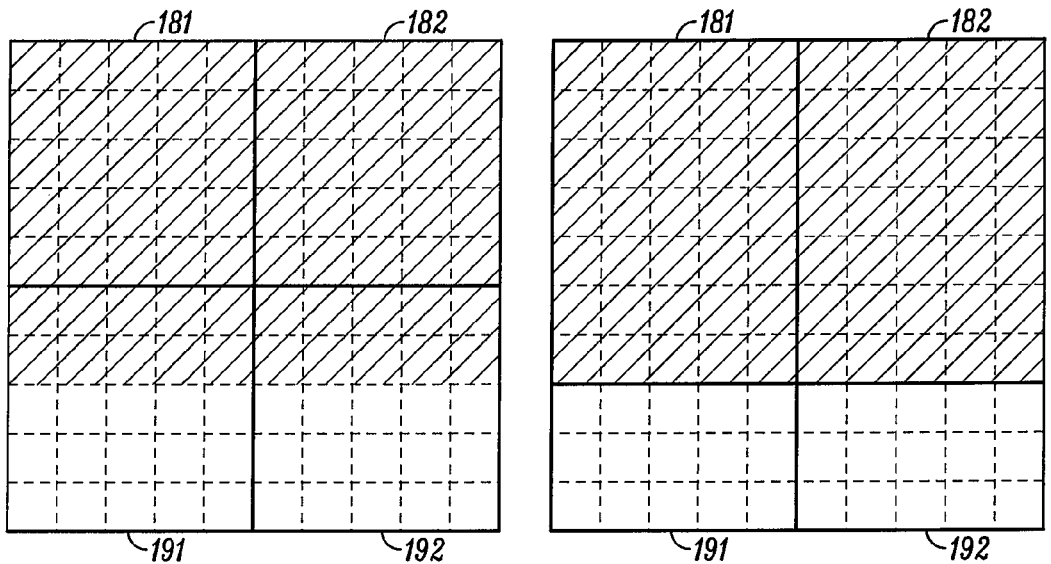
FIG. 8A shows four sub-regions in a portion of the predetermined image area before the predetermined image area is repartitioned.
FIG. 8B shows four sub-regions in a portion of the predetermined image area after the predetermined image area is repartitioned.

FIG. 8A shows four sub-regions in a portion of the predetermined image area before the predetermined image area is repartitioned. FIG. 8B shows four sub-regions in a portion of the predetermined image area after the predetermined image area is repartitioned. In FIG. 8A and FIG. 8B, each sub-region is further divided into multiple statistic-blocks. In one implementation, each statistic-block is classified either as a first type or a second type. If an analysis based on the histogram of a statistic-block indicates that it is a white type, then, such statistic-block is classified as a first type. If an analysis based on the histogram of a statistic-block indicates that it is not a white type, then, such statistic-block is classified as a second type. By analyzing histogram of each statistic block, it is possible to determine whether a statistic block is good or not (i.e., whether it is too bright). By grouping bad statistic blocks of adjacent sub-regions and use the re-grouped statistic blocks as new sub-regions, the predetermined image area can be repartitioned.

In FIG. 8A, before the repartition, each of the four sub-regions 181, 182, 191, and 192 includes 25 statistic-blocks. The sub-regions 181 and 182 each include 25 statistic-blocks of the second type. The sub-regions 191 and 192 each include 10 statistic-blocks of the second type and 15 statistic-blocks of the first type (i.e., the white type).

In FIG. 8B, after the repartition, the sub-regions 181 and 182 each include 35 statistic-blocks of the second type. The sub-regions 191 and 192 each include 15 statistic-blocks of the first type (i.e., the white type). In some implementations, after the repartition, all sub-regions can be assigned the same weight. In other implementations, after the repartition, each sub-region can be further classified as one of different types, and sub-regions of different type can be assigned to different weights. For example, in FIG. 8B, the sub-regions 181 and 182 can be classified as the second type, and the sub-regions 191 and 192 can be classified as the first type (i.e., the white type). A sub-region of the first type (i.e., the white type) can be assigned to a weight that is much smaller than the weight for a sub-region of the second type.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising: selecting a predetermined image area for a photodetector array in a barcode scanner; partitioning the predetermined image area into multiple sub-regions; capturing an image with the photodetector array; determining a type for each sub-region in the multiple sub-regions in the image captured; assigning a weight to each sub-region in the multiple sub-regions based on the type of each sub-region in the multiple sub-regions; and setting an amount of exposure for the photodetector array in the barcode scanner based on the weight for each sub-region in the multiple sub-regions.

2. The method of claim 1, wherein the determining a type for each sub-region in the multiple sub-regions comprises: classifying a sub-region either as a first type or a second type.

3. The method of claim 2, wherein the assigning the weight to each sub-region in the multiple sub-regions comprises: assigning a first weight to a sub-region if the sub-region is classified as the first type; and assigning a second weight to a sub-region if the sub-region is classified as the second type.

4. The method of claim 3, wherein the first weight is at least two times larger than the second weight.

5. The method of claim 1, wherein the determining a type for each sub-region in the multiple sub-regions comprises:

determining a type for each sub-region in the multiple sub-regions based on a histogram of pixel values.

6. The method of claim 1, wherein the setting an amount of exposure for the photodetector array comprises: setting the weight for each sub-region in the multiple sub-regions into a microchip device having the photodetector array therein.

7. A method comprising: selecting a predetermined image area for a photodetector array in a barcode scanner; partitioning the predetermined image area into multiple sub-regions; capturing an image with the photodetector array; repartitioning the predetermined image area into new multiple sub-regions based on the image captured; and setting an amount of exposure for the photodetector array in the barcode scanner based on a weight for each sub-region in the new multiple sub-regions.

8. The method of claim 7, wherein the repartitioning the predetermined image area comprises: dividing the predetermined image area into multiple statistic-blocks; classifying each statistic-block in the multiple statistic-blocks in the image captured either as a first type or a second type; determining a type distribution of the multiple statistic-blocks; and repartitioning the predetermined image area into multiple new sub-regions based on the type distribution of the multiple statistic-blocks and assigning a weight to each new sub-region.

9. The method of claim 8, wherein classifying each statistic-block in the multiple statistic-blocks comprises: classifying each statistic-block in the multiple statistic-blocks based on a histogram of pixel values.

10. The method of claim 8, wherein the setting an amount of exposure for the photodetector array comprises: setting the weight for each sub-region in the new multiple sub-regions into a microchip device having the photodetector array therein.

11. The method of claim 7, further comprising: assigning an equal weight to each sub-region in the new multiple sub-regions.

12. The method of claim 7, further comprising: assigning a weight to each sub-region in the new multiple sub-regions based on the image captured.

13. A barcode scanner for imaging target objects comprising: an illumination source for providing illumination directed toward a target object; a photodetector array located within the barcode scanner for capturing images from the target object; electronic circuitry operative to determine a weight for each sub-region in multiple sub-regions in a predetermined image area based on an image captured by the photodetector array; and a microchip device having the photodetector array therein, the microchip device being operative to receive the weight for each sub-region in the multiple sub-regions.

14. The barcode scanner of claim 13, wherein the electronic circuitry is operative to determine a weight for each sub-region in the multiple sub-regions in the predetermined image area based on a histogram of pixel values in the image captured by the photodetector array.

15. A barcode scanner for imaging target objects comprising: an illumination source for providing illumination directed toward a target object; a photodetector array located within the barcode scanner for capturing images from the target object; electronic circuitry operative to partition a predetermined image area into multiple sub-regions based on an image captured by the photodetector array; and a microchip device having the photodetector array therein, the microchip device being operative to receive a weight for each sub-region in the multiple sub-regions.

16. The barcode scanner of claim 15, wherein the electronic circuitry is operative to partition the predetermined image area into multiple sub-regions based on a histogram of pixel values in the image captured by the photodetector array.

17. The barcode scanner of claim 15, wherein the electronic circuitry is farther operative to determine the weight for each sub-region in the multiple sub-regions.

18. The barcode scanner of claim 17, wherein the electronic circuitry is operative to determine a weight for each sub-region in the multiple sub-regions based on a histogram of pixel values in the image captured by the photodetector array.

19. The barcode scanner of claim 15, wherein microchip device is operative to take an equal weight for each sub-region in the multiple sub-regions.

* * * * *